(12) United States Patent
Saimani et al.

(10) Patent No.: US 9,613,380 B2
(45) Date of Patent: Apr. 4, 2017

(54) METHOD AND SYSTEM FOR PUBLIC AND PRIVATE TEMPLATE SHARING

(71) Applicants: Jayanth Saimani, Bangalore (IN); Sanyam Agrawal, Bangalore (IN); Taylor Cody Candee, Kenosha, WI (US); Sushma Padmanabhan, Bangalore (IN); Ravi Krishna Pudi, Bangalore (IN); Deepa Chandra Bachu, Bangalore (IN); Ajit Roy, Bangalore (IN); Sumanta Das, Bangalore (IN)

(72) Inventors: Jayanth Saimani, Bangalore (IN); Sanyam Agrawal, Bangalore (IN); Taylor Cody Candee, Kenosha, WI (US); Sushma Padmanabhan, Bangalore (IN); Ravi Krishna Pudi, Bangalore (IN); Deepa Chandra Bachu, Bangalore (IN); Ajit Roy, Bangalore (IN); Sumanta Das, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/528,723

(22) Filed: Oct. 30, 2014

(65) Prior Publication Data
US 2016/0125551 A1    May 5, 2016

(51) Int. Cl.
*G07F 19/00* (2006.01)
*G06Q 40/00* (2012.01)
(Continued)

(52) U.S. Cl.
CPC ............ *G06Q 40/12* (2013.12); *G06Q 50/01* (2013.01); *H04L 67/18* (2013.01); *H04L 67/30* (2013.01)

(58) Field of Classification Search
USPC ........................................... 705/30
See application file for complete search history.

(56) References Cited

U.S. PATENT DOCUMENTS

| 8,626,769 B1 | 1/2014 | Bhatt |
| 2006/0218060 A1 | 9/2006 | Lawlor |

(Continued)

OTHER PUBLICATIONS

International Search Report and Written Opinion for PCT/US2014/067016 mailed Jun. 30, 2015 (10 pages).

*Primary Examiner* — Garcia Ade
(74) *Attorney, Agent, or Firm* — Osha Liang LLP

(57) ABSTRACT

A method for sharing templates for use with a financial management application (FMA) includes receiving, from each of multiple financial professionals, a company profile including a chart of accounts for a business operating within a commercial industry and at a geographic location, generating profile templates including, for each profile, a template including the commercial industry, the geographic location, and a redacted chart of accounts of the profile, receiving, from each of the financial professionals, a request to publicly share the template corresponding to the profile, receiving, from a small business representative, a profile creation request specifying a first commercial industry and a first geographic location, identifying a first template, and providing, in response to the profile creation request, the first template to the representative, where the representative uses the first template to create a first profile for the business.

12 Claims, 6 Drawing Sheets

(51) Int. Cl.
*H04L 29/08* (2006.01)
*G06Q 50/00* (2012.01)

(56) References Cited

U.S. PATENT DOCUMENTS

| | | | |
|---|---|---|---|
| 2008/0270316 A1* | 10/2008 | Guidotti | G06Q 40/02 |
| | | | 705/36 R |
| 2010/0205076 A1 | 8/2010 | Parson et al. | |
| 2013/0036034 A1* | 2/2013 | Karon | G06Q 40/00 |
| | | | 705/31 |
| 2014/0114817 A1* | 4/2014 | Moore | G06Q 40/125 |
| | | | 705/30 |

* cited by examiner

METHOD AND SYSTEM FOR PUBLIC AND PRIVATE TEMPLATE SHARING

BACKGROUND

Small business owners or their employees are typically tasked with tracking their own accounting for the business, often using financial management software, in order to eliminate the overhead required to hire or contract a certified accountant. This practice of handling the accounting for the business allows potential for error, given that many small business owners and their employees are not themselves certified accountants, and may be unfamiliar with the intricacies of financial accounting. The chart of accounts for a business should be tracked in a specific format dependent on, for example, the industry and the location in which the business operates.

SUMMARY

In general, in one aspect, the invention relates to a method for sharing templates for use with a financial management application (FMA). The method includes receiving, from each of multiple financial professionals using the FMA, a company profile including a chart of accounts for a small business operating within a commercial industry and at a geographic location. The method also includes generating multiple profile templates including, for each company profile, a corresponding profile template including the commercial industry, the geographic location, and a redacted version of the chart of accounts of the company profile. The method also includes receiving, from each of the financial professionals, a request to publicly share the profile template corresponding to the company profile. The method further includes receiving, from a representative of a small business using the FMA, a profile creation request specifying a first commercial industry and a first geographic location, identifying, of the multiple profile templates, a first profile template including the first commercial industry and the first geographic location, and providing, in response to the profile creation request, the first profile template to the representative, where the representative uses the first profile template to create a first company profile for the small business.

In general, in one aspect, the invention relates to a system for sharing templates for use with a financial management application (FMA), including a processor, memory, and a sharing platform stored in the memory and executing on the processor. The sharing platform includes a data repository storing a plurality of profile templates, a client interface, and a template module. The client interface includes functionality to receive, from each of multiple financial professionals using the FMA, a company profile including a chart of accounts for a small business operating within a commercial industry and at a geographic location. The client interface also includes functionality to receive, from each of the financial professionals, a request to publicly share a profile template corresponding to the company profile. The client interface further includes functionality to receive, from a representative of a small business using the FMA, a profile creation request specifying a first commercial industry and a first geographic location, and provide, in response to a profile creation request, the first profile template to the representative, where the representative uses the first profile template to create a first company profile for the small business. The template module is configured to generate multiple profile templates including, for each company profile, the corresponding profile template including the commercial industry, the geographic location, and a redacted version of the chart of accounts of the company profile. The template module is further configured to identify, of the multiple profile templates, a first profile template including the first commercial industry and the first geographic location.

In general, in one aspect, the invention relates to a non-transitory computer readable medium storing instructions for sharing templates for use with a financial management application (FMA). The computer readable medium includes instructions for receiving, from each of multiple financial professionals using the FMA, a company profile including a chart of accounts for a small business operating within a commercial industry and at a geographic location. The computer readable medium also includes instructions for generating multiple profile templates including, for each company profile, a corresponding profile template including the commercial industry, the geographic location, and a redacted version of the chart of accounts of the company profile. The computer readable medium also includes instructions for receiving, from each of the financial professionals, a request to publicly share the profile template corresponding to the company profile. The computer readable medium further includes instructions for receiving, from a representative of a small business using the FMA, a profile creation request specifying a first commercial industry and a first geographic location, identifying, of the multiple profile templates, a first profile template including the first commercial industry and the first geographic location, and providing, in response to the profile creation request, the first profile template to the representative, where the representative uses the first profile template to create a first company profile for the small business.

Other aspects of the invention will be apparent from the following description and the appended claims.

DETAILED DESCRIPTION

Figure 1:
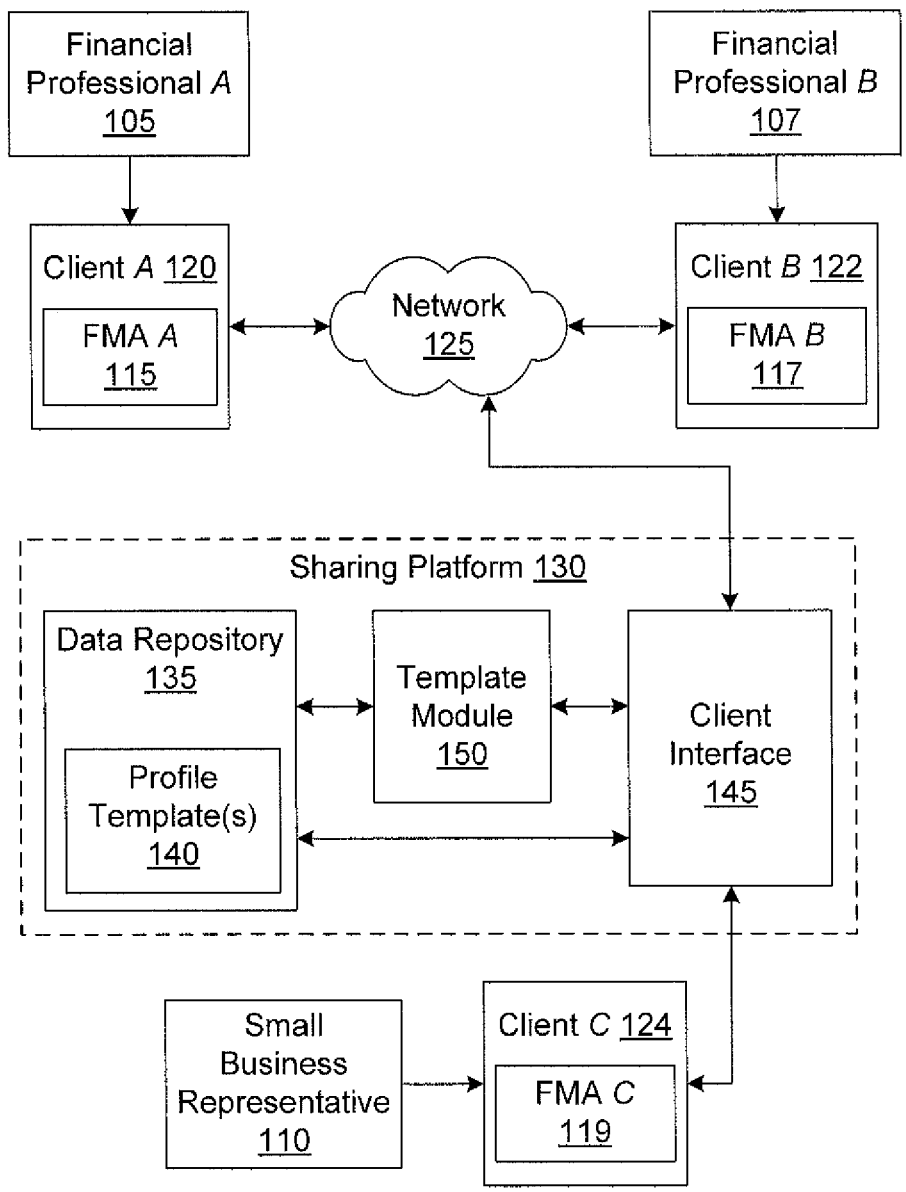
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, system, and computer-readable medium for publicly or privately sharing templates created by a financial professional that are tailored to a first small business and used to track the business's accounting. If the templates are shared publicly, they are made accessible to owners and representatives of other small businesses that share accounting-relevant characteristics with the first small business. If the templates are shared privately, they are made accessible to individuals and/or clients specified by a sharing preference designated by the financial professional. In this manner, small business owners or other individuals may be given access to templates for creating charts of accounts for a business that are correctly tailored to the business.

FIG. 1 shows a schematic diagram of a system in accordance with one or more embodiments of the invention. As shown in FIG. 1, the system includes financial professional A (105) using financial management application (FMA) A (105) executing on client A (120), financial professional B (107) using FMA B (117) executing on client B (122), and a small business representative (110) using FMA C (119) executing on client C (124). Clients A and B may be operatively connected to a network (125). The system further includes a sharing platform. (130). Each of these components is described below.

In one or more embodiments of the invention, a financial professional (105, 107) is an individual or company that render financial services to client businesses. A financial professional (105, 107) may be, for example, an accountant or an accounting firm. Alternatively, a financial professional (105, 107) may be a broker, investment adviser, lawyer, insurance agent, financial planner, or any group including one or more individuals in the above categories. A financial professional (105, 107) may provide a number of financial services to clientele including financial accounting for client business entities.

Financial services provided by a financial professional (105, 107) may include creating and managing company profiles (205) for a business entity using a FMA (115, 117) executing on a client (120, 122). In one or more embodiments of the invention, a company profile (205) is a data structure used to store and monitor a company's financial data. A company profile (205) may be created for a company based on a profile template (140), in accordance with one or more embodiments of the invention.

In one or more embodiments of the invention, a profile template (140) is a data structure that may be used to build a company profile for a business. A profile template (140) may be generated from a previously created company profile (205) in accordance with one or more embodiments of the invention. A profile template (140) may include a sharing preference indicating whether the creator of the profile template (140) wishes to share the profile template (140) publicly, privately, or not at all, in accordance with one or more embodiments of the invention. Company profiles and profile templates are described in further detail below.

In one or more embodiments of the invention, a small business representative (110) is an owner, employee, consultant, or other representative of a small business who handles financial matters for the small business. A small business representative (110) may track financial data for the business entity by creating and/or maintaining a company profile (205) using a FMA (119) executing on a client (124). A small business representative (110) may track financial data for a business entity either alone or with the assistance of a financial professional (105, 107). In one or more embodiments of the invention, multiple financial professionals and/or small business representatives may use separate instances of FMAs (115, 117, 119) executing on multiple clients (120, 122, 124).

In one or more embodiments of the invention, a client (120, 122, 124) may be any device with a processor and memory including, but not limited to: a desktop computer, a laptop computer, a tablet, a smartphone, a feature phone, a server, a blade, a handheld gaming device, smart computing glasses, and/or any other suitable device. A client (120, 122, 124) may be substantially similar in design and/or functionality to the computer system shown in FIG. 5. A client (120, 122, 124) may include a FMA (115, 117, 119) stored in the memory and configured to execute on the processor of the client (120, 122, 124), in accordance with one or more embodiments of the invention.

In one or more embodiments of the invention, a client (120, 122, 124) may be operatively connected to a public or private network (125) and/or a local or remote server via a wired and/or wireless connection. In one or more embodiments of the invention, a client (120, 122, 124) includes functionality to communicate directly with the client interface (140) (described in further detail below). In one or more embodiments of the invention, a client (120, 122, 124) includes functionality to communicate indirectly with the client interface (140) via a public or private network.

In one or more embodiments of the invention, a FMA (115, 117, 119) is a software application written in any programming language and designed to be used by a financial professional (105, 107) and/or a small business representative (110) to manage various aspects of business entities. In one or more embodiments of the invention, the FMA (115, 117, 119) may be an accounting application, a tax preparation application, a payroll application, a personnel application, a general business management application, a combination thereof, or any other application for managing, at least in part, financial matters and/or operations of a business entity.

In one or more embodiments of the invention, a FMA (115, 117, 119) is obtained from a software provider and installed and executed on a client (120, 122, 124) operated by a financial professional (105, 107) and/or a small business representative (110). A FMA (115, 117, 119) may include instructions that, when executed by a client processor, enable the client to perform one or more of the functions described below.

In one or more embodiments of the invention, a FMA (115, 117, 119) includes functionality to receive, process, and store financial data for business entities. Financial data for a business entity may be entered into a FMA (115, 117, 119) by a financial professional (105, 107), a small business representative (110), and/or any other party associated with a business entity.

In one or more embodiments of the invention, a FMA (115, 117, 119) includes functionality track financial data for a business entity, including, for example, a chart of accounts, assets and liabilities, profits for a specific time period, or any other data related to the financial matters of the business entity. In one or more embodiments of the invention, a business entity's financial data is stored and monitored in a company profile (205) using a FMA (115, 117, 119).

In one or more embodiments of the invention, the sharing platform (130) includes a data repository (135), a client interface (145), and a template module (150). The sharing platform (130) may execute on one or more computing systems (e.g., servers) in accordance with one or more embodiments of the invention.

In one or more embodiments of the invention, the data repository (135) is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. A data repository (135) may be located on the same client (120, 122, 124) as a FMA (115, 117, 119), on the same computing system as the sharing platform (130), and/or on any computing system locally or remotely accessible by a FMA (115, 117, 119). In one or more embodiments of the invention, the data repository (135) includes functionality to store financial data in company profiles (205), profile templates (140), and/or any other data structure useful for storing financial data.

In one or more embodiments of the invention, the client interface (145) includes functionality to obtain financial data from financial professionals (105, 107) and small business representatives (110). The client interface (145) includes functionality to communicate with a FMA (115, 117, 119) executing on a client (120, 122, 124) in order to obtain the financial data. The client interface (145) may request financial data from a FMA (115, 117, 119) or a FMA (115, 117, 119) may send unrequested financial data to the client interface (145). Financial data may be obtained by a FMA (115, 117, 119) in the form of a company profile (205), a profile template (140), and/or any other data structure useful for storing financial data. The client interface (145) includes functionality to store financial data including company profiles and profile templates in the data repository (135) and retrieve financial data from the data repository (135).

Figure 2:
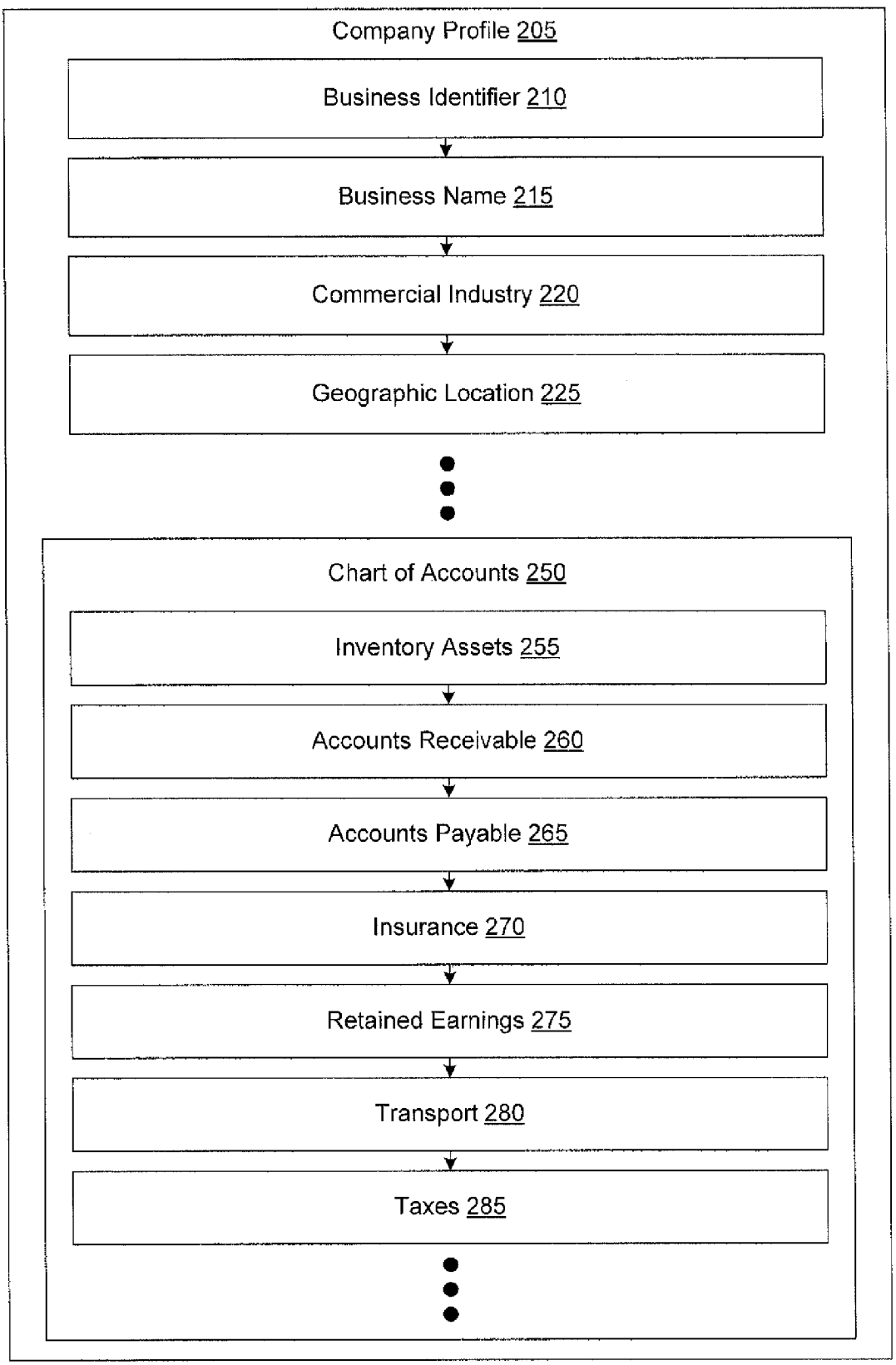
FIG. 2 shows a data diagram in accordance with one or more embodiments of the invention.

FIG. 2 shows a data structure for storing a company profile (205) in accordance with one or more embodiments of the invention.

In one or more embodiments of the invention, a company profile (205) is a data structure including fields for a business identifier (210), a business name (215), a commercial industry (220), a geographic location (225), and a chart of accounts (250). One of ordinary skill in the art will appreciate that more fields or fewer fields than those enumerated above may be included in a company profile (205) without departing from aspects of the invention. A company profile (205) may be stored as a linked list, stack, queue, associative array, or any other format useful for storing the information contained in the company profile (205). Each field of the company profile (205) may be stored in data objects, numerical format, string format, or any other format useful for storing the information contained in that particular field.

In one or more embodiments of the invention, a company profile (205) may be used to track information about a specific business entity including accounting information stored in the chart of accounts (250). In one or more embodiments of the invention, a company profile (205) may be generated based on a profile template (140), for example, by adding additional fields and/or company-specific data to the profile template.

In one or more embodiments of the invention, the business identifier (215) field stores an identifier used by the system to identify and access the company profile for the business. In one or more embodiments of the invention, the business name (215) field stores the name of the business for which the company profile (205) is used to track information. The business name (215) field may include information about the type of the business involved, for example, if the business name includes a designation such as "LLC", indicating that the business is a limited liability company.

In one or more embodiments of the invention, the commercial industry (220) field stores the specific industry in which the business operates. One or more fields may be included in or absent from the chart of accounts (250), or may be otherwise affected, based on the commercial industry of the business. For example, the chart of accounts for a law firm may not include a field for inventory assets (255), as a law firm typically has no inventory.

In one or more embodiments of the invention, the geographic location (225) field stores the specific geographic location where the business operates. One or more fields may be included in or absent from the chart of accounts (250), or may be otherwise affected, based on the geographic location of the business. For example, the chart of accounts (250) for a business in India may include a field related to Tax Deducted at Source (TDS) (not shown), which is a type of income tax that exists only in India.

In one or more embodiments of the invention, the chart of accounts (250) is a data structure within the company profile (140) of a business entity, storing the accounts used by the business entity to define each class of items for which money (or its equivalent) is spent or received. The chart of accounts (250) may be used to organize the finances of the business entity and to segregate expenditures, revenue, assets, liabilities, etc., in order to give interested parties a better understanding of the financial health of the entity. The chart of accounts (250) may be configured based on the commercial industry, the geographic location, and/or one or more additional or alternative fields (e.g., business size, business age, etc.) of the company profile (140) containing the chart of accounts (250).

In one or more embodiments of the invention, the chart of accounts (250) includes fields for inventory assets (255), accounts receivable (260), accounts payable (265), insurance (270), retained earnings (275), transport (280), and/or taxes (285). One of ordinary skill in the art will appreciate that more fields or fewer fields than those enumerated above may be included in a chart of accounts (250) without departing from aspects of the invention. A chart of accounts (250) may be stored as a linked list, stack, queue, associative array, or any other format useful for storing the information contained in the chart of accounts (250). Each field of the chart of accounts (250) may be stored in data objects, numerical format, string format, or any other format useful for storing the information contained in that particular field.

Figure 3:
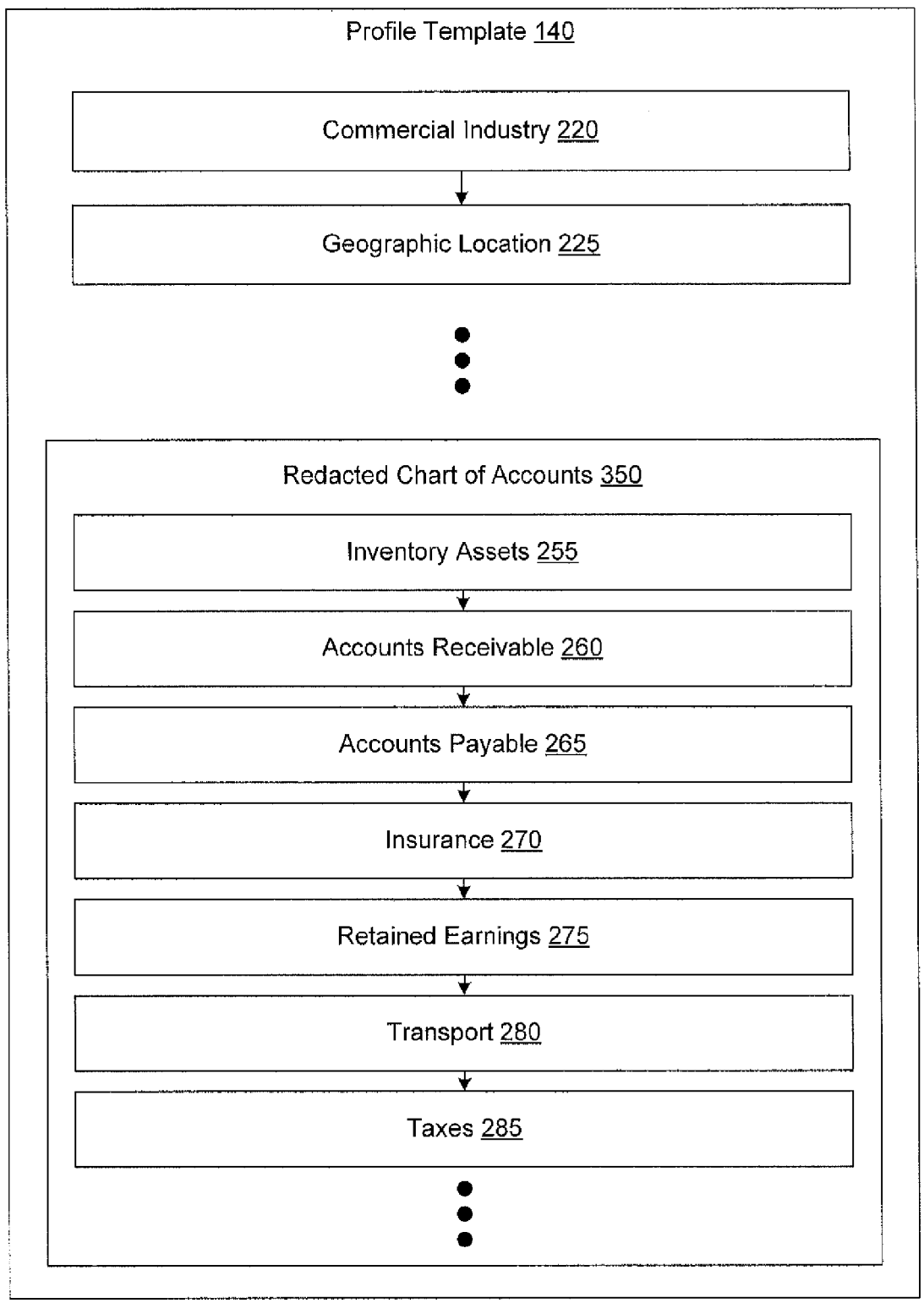
FIG. 3 shows a data diagram in accordance with one or more embodiments of the invention.

FIG. 3 shows a data structure for storing a profile template (140) in accordance with one or more embodiments of the invention.

In one or more embodiments of the invention, a profile template (140) is a data structure including fields for a commercial industry (220), a geographic location (225), and a redacted chart of accounts (350). One of ordinary skill in the art will appreciate that more fields or fewer fields than those enumerated above may be included in a profile template (140) without departing from aspects of the invention. In one or more embodiments of the invention, a profile template (140) may be generated based on a company profile (205), for example, by removing fields and/or company-specific data from the company profile (205).

In one or more embodiments of the invention, the redacted chart of accounts (350) is a data structure within the profile template (140) configured to store the accounts used by a generic business entity to define each class of items for which money (or its equivalent) is spent or received. In one or more embodiments of the invention, the redacted chart of accounts (350) is configured for a business in a specific commercial industry and geographic location stored in the commercial industry (220) and geographic location (225) fields of the profile template (140). The redacted chart of accounts (350) may be configured based the commercial industry, the geographic location, and/or one or more additional or alternative fields (e.g., business size, business age, etc.) of the profile template (140) containing the redacted chart of accounts (350).

In one or more embodiments of the invention, the redacted chart of accounts (350) includes fields for inventory assets (355), accounts receivable (360), accounts payable (365), insurance (370), retained earnings (375), transport (380), and/or taxes (385). One of ordinary skill in the art will appreciate that more fields or fewer fields than those enumerated above may be included in a redacted chart of accounts (350) without departing from aspects of the invention. A redacted chart of accounts (350) may be stored as a linked list, stack, queue, associative array, or any other format useful for storing the information contained in the redacted chart of accounts. Each field of the redacted chart of accounts (350) may be stored in data objects, numerical format, string format, or any other format useful for storing the information contained in that particular field.

Returning to FIG. 1, in one or more embodiments of the invention, the template module (150) includes functionality to generate profile templates (140) from company profiles (205).

In one or more embodiments of the invention, the template module (150) includes functionality to redact company-specific data and/or remove fields from a company profile (205) in order to generate a corresponding profile template (140). The template module (150) may generate a profile template (140) from a company profile (205) by manipulating the fields and/or data stored by the company profile (205) in any other fashion known to those of ordinary skill in the art.

In one or more embodiments of the invention, the client interface (145) includes functionality to receive a request to publicly or privately share a profile template (140). If the request is to privately share the profile template, the request may include a sharing preference indicating that the individual initiating the request wishes to share the profile template (140) with a restricted set of individuals. For example, a sharing preference may specify that the profile template (140) may only be shared with clients connected to the same network as the client operated by the individual requesting the profile template (140). As another example, the sharing preference may include a security credential, such as a password or username/password combination, that is entered by any individual wishing to access the profile template (140).

In one or more embodiments of the invention, the client interface (145) includes functionality to receive a request to create a company profile (205) for a business entity from a client (120) operated by a financial professional (105) or a small business representative (110). The profile creation request may specify one or more details including, for example, the commercial industry, geographic location, business size, and/or business age of the business entity for which the company profile is to be created.

In one or more embodiments of the invention, the client interface (145) includes functionality to identify a profile template (140) that includes the one or more details included in the profile creation request. For example, if the profile creation request is for a business in a specific commercial industry and geographic location, the client interface may identify a profile template having commercial industry and geographic location fields containing the same value specified in the request.

In one or more embodiments of the invention, the client interface (145) includes functionality to determine whether a client/individual who has sent a profile creation request satisfies a sharing preference provided in a prior request to privately share a profile template (140). The client interface (145) may determine that the sharing preference is satisfied, for example, if the individual submits the correct credentials specified by the sharing preference for providing access the profile template (140).

In one or more embodiments of the invention, the client interface (145) includes functionality to provide a profile template (140) to a client (120) operated by a financial professional (105) and/or a small business representative (110). The client interface (145) may provide the profile template (140) to an individual in response to receiving a profile creation request from the individual. The client interface (145) may provide the profile template (140) to an individual based on a sharing preference specified in a request received from a financial professional to privately share the profile template (140).

While FIG. 1 shows a configuration of components, other configurations may be used without departing from the scope of the invention. For example, various components may be combined to create a single component. As another example, the functionality performed by a single component may be performed by two or more components.

Figure 4A:
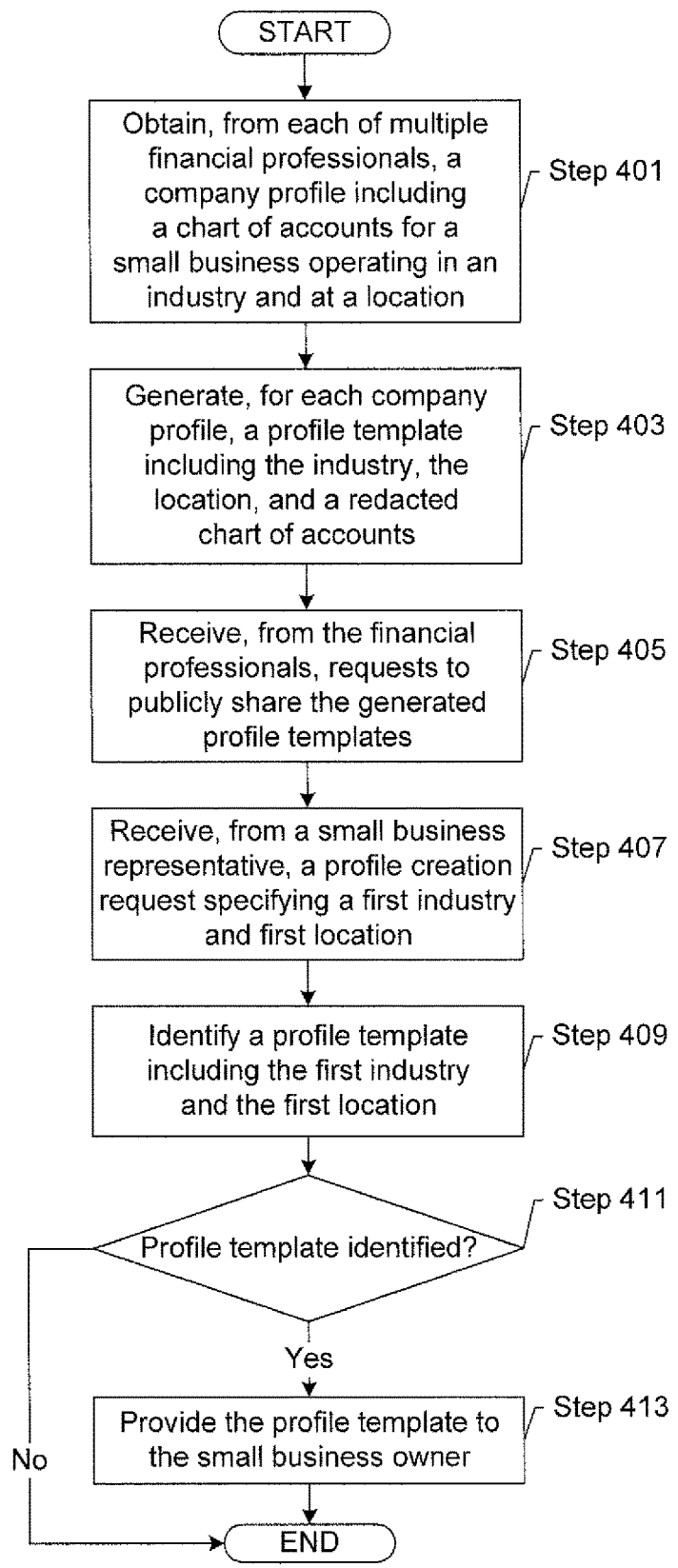
FIGS. 4A and 4B show flowcharts in accordance with one or more embodiments of the invention.

FIG. 4A shows a flowchart for publicly sharing a profile template generated by a financial professional, in accordance with one or more embodiments of the invention.

In Step 401, in accordance with one or more embodiments of the invention, company profiles are obtained from multiple financial professionals using FMAs, where each company profile includes a chart of accounts for a small business operating within a commercial industry and at a geographic location. Each company profile may be created by a financial professional using an FMA as part of the financial professional's services rendered to a small business client.

In Step 403, in accordance with one or more embodiments of the invention, a profile template is generated for each received company profile, where each profile template includes the commercial industry, the geographic location, and a redacted version of the chart of accounts of the corresponding company profile.

In Step 405, in accordance with one or more embodiments of the invention, requests are received from the multiple financial professionals, where each request is a request to publicly share the profile template generated for the company profile received from the financial professional sending the request. Specifically, after creating a company profile a financial professional may select an option within the FMA to publicly share the profile template based on the company profile, initiating a request to the sharing platform to make the profile template accessible to the public. For example, a financial professional (i.e., an accountant) has an option to share publicly a template that was created by the financial professional. Once the financial profession chooses to share the template publicly, the template (with geographical, industry location, redacted chart of accounts) is available for use publicly.

In Step 407, in accordance with one or more embodiments of the invention, a profile creation request is received from a representative of a first small business using the FMA, the request specifying a commercial industry and a geographic location of the first small business. Specifically, if the representative chooses to create a new company profile within the FMA, the representative is queried for basic details (including industry and location) about the small business. After the details are entered, the FMA initiates a request to the sharing platform for a suitable profile template. In one or more embodiments of the invention, when a small business creates a profile in the FMA, the system automatically applies the best template based on the small business location and/or industry selected.

In Step 409, in accordance with one or more embodiments of the invention, a profile template (of the multiple profile templates generated in Step 405) may be identified as including the commercial industry and the geographic location of the first small business.

In Step 411, in accordance with one or more embodiments of the invention, a determination is made whether a profile template including the commercial industry and the geographic location of the first small business was identified. If such a profile template was not identified, the process proceeds to end. If such a profile template was identified, the process proceeds to Step 413.

In Step 413, in accordance with one or more embodiments of the invention, the identified profile template is provided to the representative of the first small business, in response to the profile creation request, for use by the representative to create a company profile for the first small business. After Step 413 is completed, the process proceeds to end.

Figure 4B:
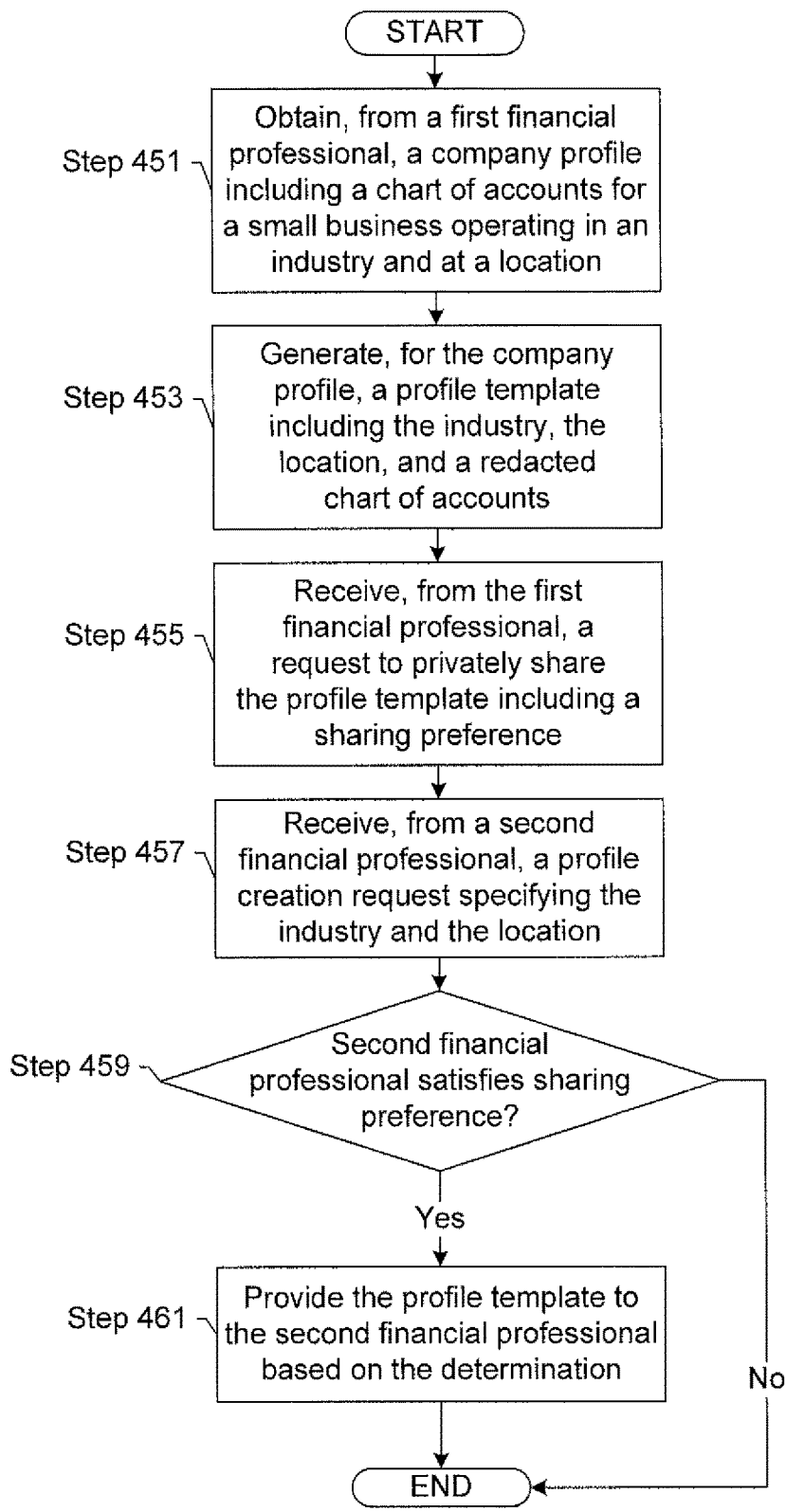

FIG. 4B shows a flowchart for privately sharing a profile template generated by a financial professional, in accordance with one or more embodiments of the invention.

In Step 451, in accordance with one or more embodiments of the invention, a company profile is obtained from a first financial professional using a FMA, where the company profile includes a chart of accounts for a small business operating within a commercial industry and at a geographic location. A company profile may be created by the first financial professional using an FMA as part of the first financial professional's services rendered to a small business client.

In Step 453, in accordance with one or more embodiments of the invention, a profile template is generated for the company profile, where the profile template includes the commercial industry, the geographic location, and a redacted version of the chart of accounts of the company profile.

In Step 455, in accordance with one or more embodiments of the invention, a request is received from the first financial professional to privately share the profile template generated in Step 453. The request may include a sharing preference identifying individuals and/or clients allowed to privately access the profile template, credentials required from an individual to access the profile template, and/or any other information useful for restricting access to the profile template. Specifically, after creating a company profile, the first financial professional may select an option within the FMA to privately share the profile template based on the company profile, initiating a request to the sharing platform to make the profile template accessible to the identified individuals/ clients.

In Step 457, in accordance with one or more embodiments of the invention, a profile creation request is received from a second financial professional using a FMA, the request specifying the same commercial industry and the same geographic location of the small business for which the company profile was received in Step 451. Specifically, if the second financial professional chooses to create a new company profile within the FMA, the second financial professional is queried for basic details (including industry and location) about the small business. After the details are entered, the FMA initiates a request to the sharing platform for a suitable profile template. For example, when a financial professional (i.e., an accountant) is creating a new company profile (on behalf of the small business) within the FMA, the financial professional may go to the centrally shared location and explicitly choose one of the publicly or privately shared templates created, as described above. When a financial professional chooses a specific template, that template is applied to the new company profile that is being created.

In Step 459, in accordance with one or more embodiments of the invention, a determination is made whether the second financial professional satisfies the sharing preference included in the request to privately share the profile template. If the second financial professional does not satisfy the sharing preference, the process proceeds to end. If the second financial satisfies the sharing preference, the process proceeds to Step 461.

In Step 461, in accordance with one or more embodiments of the invention, the profile template is provided to the second financial professional, in response to the profile creation request and based on the determination. After Step 461 is completed, the process proceeds to end.

While the various steps in these flowcharts are presented and described sequentially, one of ordinary skill will appreciate that some or all of the steps may be executed in different orders, may be combined or omitted, and some or all of the steps may be executed in parallel.

The following example is for explanatory purposes only and not intended to limit the scope of the invention. Suppose that Amy and Brad are accountants working at the same accounting firm, Awesome Accountants. Using a FMA, Amy creates a company profile including a chart of accounts for a manufacturing business client of Awesome Accountants, called Milton's Manufacturing, operating in the USA. Amy enters "Milton's Manufacturing" into the business name field, "manufacturing" into the commercial industry field, and "USA" into the geographic location field of the company profile. Because Milton's is a manufacturing business, the chart of accounts that Amy sets up includes a field for inventory assets.

Using the FMA, Brad creates a company profile including a chart of accounts for a law firm client of Awesome Accountants, called Litigious Lawyers, LLP, operating in Canada. Brad enters "Litigious Lawyers into the business name field, "legal" into the commercial industry field, and "Canada" into the geographic location field of the company profile. Because Litigious is a law firm, the chart of accounts that Brad sets up does not include a field for inventory assets.

Both Amy and Brad select an option within the FMA to publicly share profile templates based on the company profiles they have created. Accordingly, their respective computers send their company profiles to the sharing platform, executing on a remote server, along with requests to generate and publicly share profile templates based on their company profiles.

At the sharing platform, a profile template is generated from each company profile. Each profile template is generated by removing company-specific information from the corresponding company profile, for example, the business names and data contained in the fields of the charts of accounts. Each profile template retains at least the commercial industry and geographic location of the company profile from which the profile template was generated.

Charlie is the owner of Charlie's Carpets, a carpet manufacturing firm in the USA. Charlie cannot afford a professional accountant, so Charlie decides to create a company profile for Charlie's Carpets using the FMA. Charlie selects an option to create the company profile based on a profile template created by a financial professional. Accordingly, Charlie's computer sends a request to the sharing platform, the request specifying that Charlie requires a profile template for a manufacturing business in the USA.

The sharing platform identifies the profile template submitted by Amy, because the profile template submitted by Amy was generated from a company profile for a manufacturing business in the USA and the commercial industry and geographic location fields match Charlie's request. Accordingly, Amy's profile template and its chart of accounts are well-tailored for a business such as Charlie's business.

Finally, the sharing platform sends, via a computer network, Amy's profile template to Charlie's computer. Charlie's FMA creates a company profile based on Amy's profile template, including adding a business name field storing the name "Charlie's Carpets". Charlie further modifies the company profile by entering specific accounting information for his company into the fields included in the company profile.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 5:
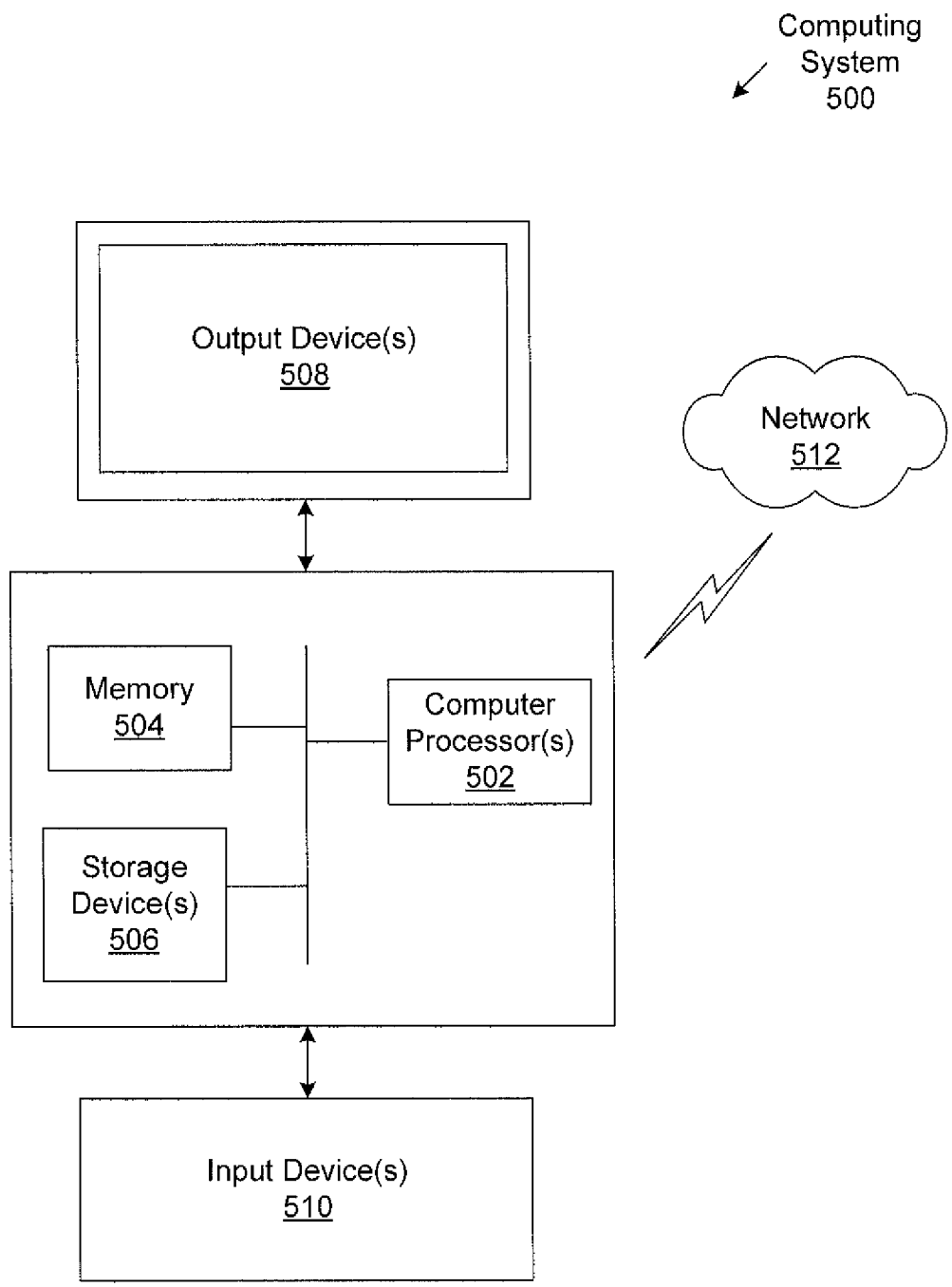
FIG. 5 shows a computing system in accordance with one or more embodiments of the invention.

For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sharing templates for use with a financial management application (FMA), comprising:
   obtaining, from each of a plurality of financial professionals using the FMA, a company profile comprising a data structure that includes:
      a first field storing a chart of accounts for a small business,
      a second field storing a commercial industry that the small business operates within, and
      a third field storing a geographic location where the small business operates,
      wherein the company profiles include a new company profile obtained from a first financial professional, and wherein the new company profile comprises a new chart of accounts for a new small business operating within a new commercial industry and at a new geographic location;
   generating a plurality of profile templates comprising, for each company profile, a profile template comprising the commercial industry, the geographic location, and a redacted version of the chart of accounts of the company profile by removing company-specific data from the first field, such that the redacted version of the chart of accounts is configured for a generic business entity operating within the commercial industry of the second field of the data structure, and at the geographic location of the third field of the data structure,
      wherein the plurality of profile templates include a new profile template comprising the new commercial industry, the new geographic location, and a redacted version of the new chart of accounts;
   receiving, from the first financial professional using the FMA on a first client, a sharing preference that specifies the new profile template is shareable only with clients operatively connected to the first client by a private network;

receiving, from one or more of the plurality of financial professionals, one or more requests to publicly share one or more of the plurality of profile templates;

receiving, from a representative of a first small business using the FMA, a profile creation request specifying a first commercial industry and a first geographic location of the first small business;

identifying, from the plurality of profile templates, a first profile template comprising the first commercial industry at the second field of the first profile template and the first geographic location at the third field of the first profile template;

providing, in response to the profile creation request, the first profile template to the representative, wherein the representative uses the first profile template to create a first company profile for the first small business;

receiving, from a second financial professional using the FMA on a second client, a new profile creation request specifying the new commercial industry and the new geographic location;

determining that the second client of the second financial professional satisfies the sharing preference by being operatively connected to the first client by the private network; and providing, in response to the new profile creation request and the determination that the second client is operatively connected to the first client by the private network, the new profile template to the second financial professional.

2. The method of claim 1, wherein the sharing preference comprises a security credential, and wherein determining that the second financial professional satisfies the sharing preference comprises obtaining the security credential from the second financial professional.

3. The method of claim 1, wherein the chart of accounts comprises at least one account selected from a group consisting of inventory assets, accounts receivable, accounts payable, insurance, retained earnings, transport, and taxes.

4. The method of claim 1, wherein the profile creation request further specifies at least one item selected from a group consisting of business size and business age, and wherein the first profile template further comprises the at least one item.

5. A computer readable medium for sharing templates for use with a financial management application (FMA), comprising instructions that, when executed by a processor, perform the steps of:

obtaining, from each of a plurality of financial professionals using the FMA, a company profile comprising a data structure that includes:
  a first field storing a chart of accounts for a small business,
  a second field storing a commercial industry that the small business operates within, and
  a third field storing a geographic location where the small business operates,
  wherein the company profiles include a new company profile obtained from a first financial professional, the new company profile comprising a new chart of accounts for a new small business operating within a new commercial industry and at a new geographic location;

generating a plurality of profile templates comprising, for each company profile, a profile template comprising the commercial industry, the geographic location, and a redacted version of the chart of accounts of the company profile by removing company-specific data from the first field, such that the redacted version of the chart of accounts is configured for a generic business entity operating within the commercial industry of the second field of the data structure, and at the geographic location of the third field of the data structure, wherein the plurality of profile templates include a new profile template comprising the new commercial industry, the new geographic location, and a redacted version of the new chart of accounts;

receiving, from the first financial professional using the FMA on a first client, a sharing preference that specifies the new profile template is shareable only with clients operatively connected to the first client by a private network;

receiving, from one or more of the plurality of financial professionals, one or more requests to publicly share one or more of the plurality of profile templates;

receiving, from a representative of a first small business using the FMA, a profile creation request specifying a first commercial industry and a first geographic location of the first small business;

identifying, from the plurality of profile templates, a first profile template comprising the first commercial industry at the second field of the first profile template and the first geographic location at the third field of the first profile template;

providing, in response to the profile creation request, the first profile template to the representative, wherein the representative uses the first profile template to create a first company profile for the first small business;

receiving, from a second financial professional using the FMA on a second client, a new profile creation request specifying the new commercial industry and the new geographic location;

determining that the second client of the second financial professional satisfies the sharing preference by being operatively connected to the first client by the private network; and providing, in response to the new profile creation request and the determination that the second client is operatively connected to the first client by the private network, the new profile template to the second financial professional.

6. The computer readable medium of claim 5, wherein the sharing preference comprises a security credential, and wherein determining that the second financial professional satisfies the sharing preference comprises obtaining the security credential from the second financial professional.

7. The computer readable medium of claim 5, wherein the chart of accounts comprises at least one account selected from a group consisting of inventory assets, accounts receivable, accounts payable, insurance, retained earnings, transport, and taxes.

8. The computer readable medium of claim 5, wherein the profile creation request further specifies at least one item selected from a group consisting of business size and business age, and wherein the first profile template further comprises the at least one item.

9. A system for sharing templates for use with a financial management application (FMA), comprising:
  a processor;
  memory;
  a sharing platform stored in the memory and executing on the processor, comprising:

a data repository storing a plurality of profile templates,
a client interface configured to:
  obtain, from each of a plurality of financial professionals using the FMA, a company profile comprising a data structure that includes:
    a first field storing a chart of accounts for a small business,
    a second field storing a commercial industry that the small business operates within, and
    a third field storing a geographic location where the small business operates,
  wherein the company profiles include a new company profile obtained from a first financial professional, the new company profile comprising a new chart of accounts for a new small business operating within a new commercial industry and at a new geographic location;
  receive, from the first financial professional using the FMA on a first client, a sharing preference that specifies a new profile template is shareable only with clients operatively connected to the first client by a private network;
  receive, from one or more of the plurality of financial professionals, one or more requests to publicly share one or more of the plurality of profile templates;
  receive, from a representative of a first small business using the FMA, a profile creation request specifying a first commercial industry and a first geographic location of the first small business;
  identify, from the plurality of profile templates, a first profile template comprising the first commercial industry at the second field of the first profile template and the first geographic location at the third field of the first profile template;
  provide, in response to the profile creation request, the first profile template to the representative, wherein the representative uses the first profile template to create a first company profile for the first small business;
  receive, from a second financial professional using the FMA on a second client, a new profile creation request specifying the new commercial industry and the new geographic location;
  determine that the second client of the second financial professional satisfies the sharing preference by being operatively connected to the first client by the private network; and
  provide, in response to the new profile creation request and the determination that the second client is operatively connected to the first client by the private network, the new profile template to the second financial professional; and
a template module configured to generate the plurality of profile templates comprising, for each company profile, a profile template comprising the commercial industry, the geographic location, and a redacted version of the chart of accounts of the company profile by removing company-specific data from the first field, such that the redacted version of the chart of accounts is configured for a generic business entity operating within the commercial industry of the second field of the data structure, and at the geographic location of the third field of the data structure,
  wherein the plurality of profile templates include the new profile template comprising the new commercial industry, the new geographic location, and a redacted version of the new chart of accounts.

10. The system of claim 9, wherein the sharing preference comprises a security credential, and wherein determining that the second financial professional satisfies the sharing preference comprises obtaining the security credential from the second financial professional.

11. The system of claim 9, wherein the chart of accounts comprises at least one account selected from a group consisting of inventory assets, accounts receivable, accounts payable, insurance, retained earnings, transport, and taxes.

12. The system of claim 9, wherein the profile creation request further specifies at least one item selected from a group consisting of business size and business age, and wherein the first profile template further comprises the at least one item.

\* \* \* \* \*